Oct. 17, 1961 W. H. TANKE 3,004,611
FRONT MOUNTED BEDDER
Filed Sept. 23, 1959 3 Sheets-Sheet 1

Inventor
Willard H. Tanke
By Howard B. Scheckman
Attorney

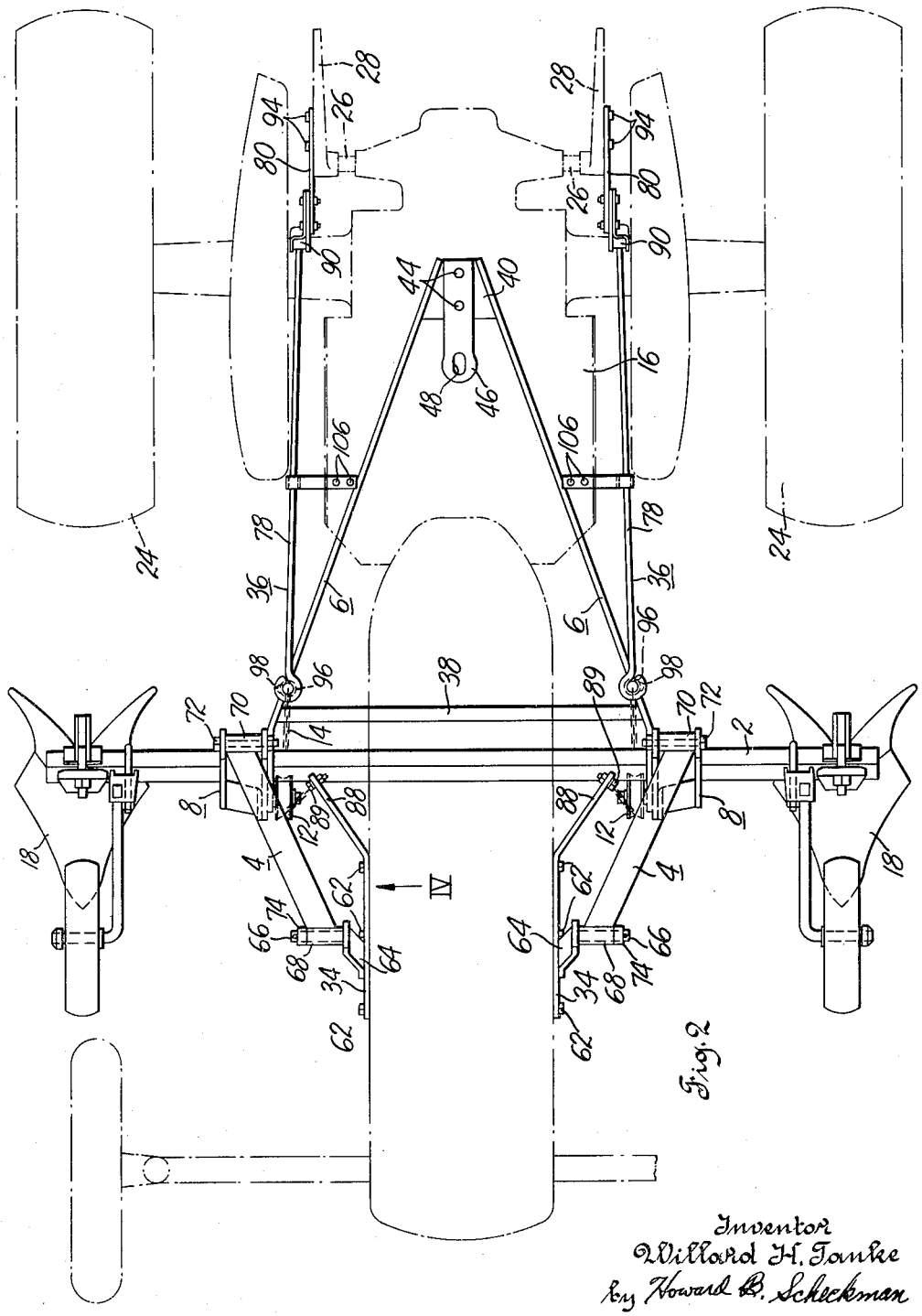

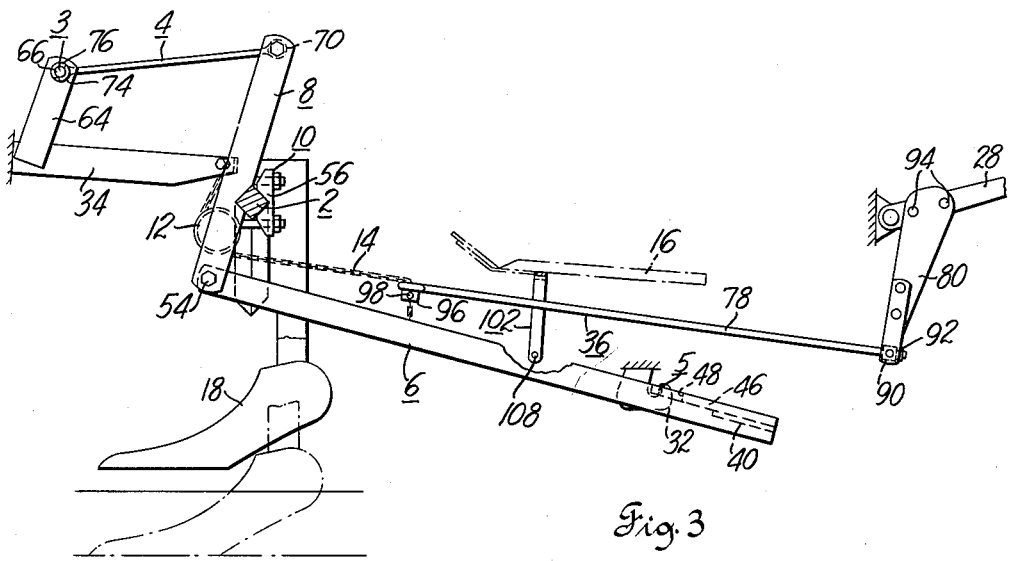
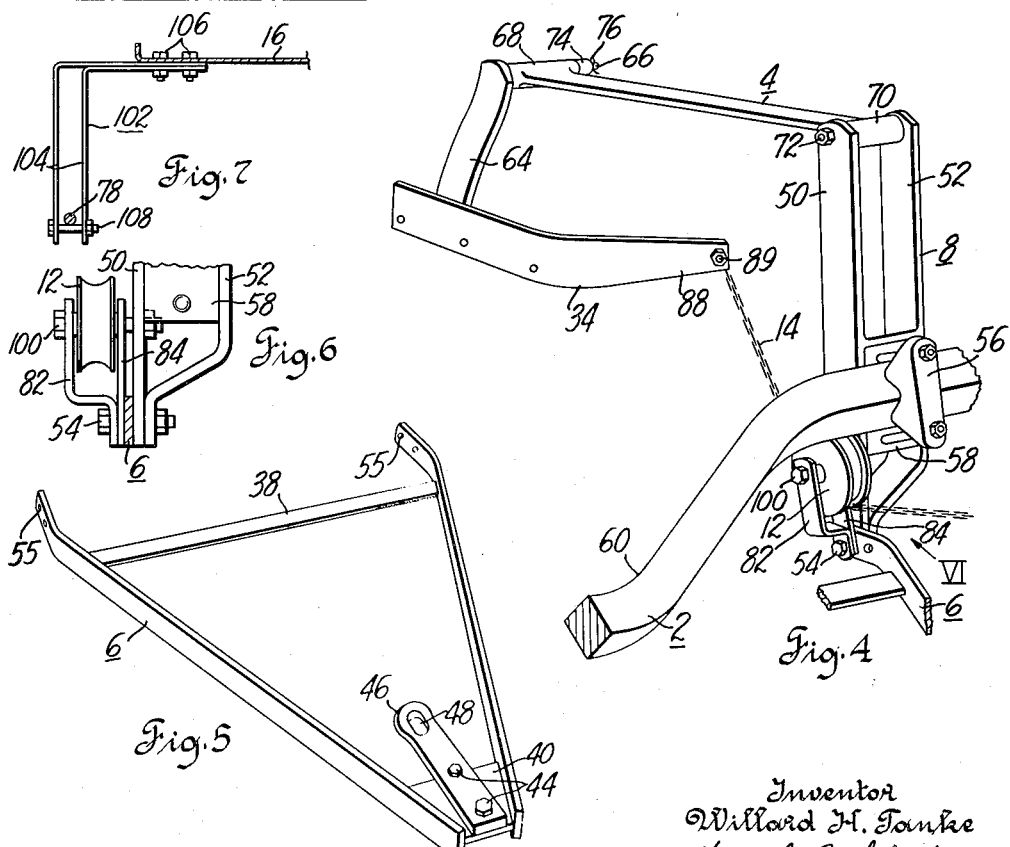

United States Patent Office 3,004,611
Patented Oct. 17, 1961

3,004,611
FRONT MOUNTED BEDDER
Willard H. Tanke, La Crosse, Wis., assignor to Allis-Chalmers Manufacturing Company, Milwaukee, Wis.
Filed Sept. 23, 1959, Ser. No. 841,864
7 Claims. (Cl. 172—308)

This invention relates to agricultural implements and more particularly to a front mounted, tool bar support structure, for a tractor.

Prior art tool bar support structures, of the front mounted type, suffer from a number of disadvantages:

(1) The ground engaging tools are mounted to move in an arc. As a result, the tools can be correctly adjusted for only one position. This is because when the tools are raised or lowered they rotate slightly and tilt from their correct position.

(2) The tool bar support structure obstructs the side of the tractor. This makes it difficult to get on or off the tractor from the side.

(3) The draft bar is connected to the tractor at only one point. Consequently the draft bar can be easily jarred sideways.

(4) The draft bar must be made strong enough to carry the entire draft load.

It is an object of this invention to provide a front mounted tool bar structure, that provides substantially parallel movement of the ground engaging tools within their working range.

It is another object of this invention to provide a tool bar support structure that does not obstruct the side of the tractor.

It is another object of this invention to provide a tool bar support structure wherein the tool bar is supported against side sway.

It is another object of this invention to provide a tool bar support stucture wherein the draft bar does not carry the entire draft load.

Other objects and advantages will appear from the following description considered in conjunction with the attached drawings, in which:

FIG. 2 is a plan view of FIG. 1 showing the tool bar support structure, with the tractor shown in phantom;

FIG. 3 is a view similar to FIG. 1 showing the tools in their raised position, the lowered or ground engaging position of the tools being shown in dotted lines;

FIG. 4 is a perspective view of FIG. 2 taken in the direction of arrow IV, with the tool bar support structure shown disconnected from the tractor;

FIG. 5 is a perspective view of the draw bar;

FIG. 6 is a sectional view of FIG. 4 taken in the direction of arrow VI, showing the pulley, main brace, and draw bar; and FIG. 7 is a sectional view of FIG. 1 taken in the direction of arrows VII—VII, showing the guide that supports the lift rod.

Invention generally

Figure 1:
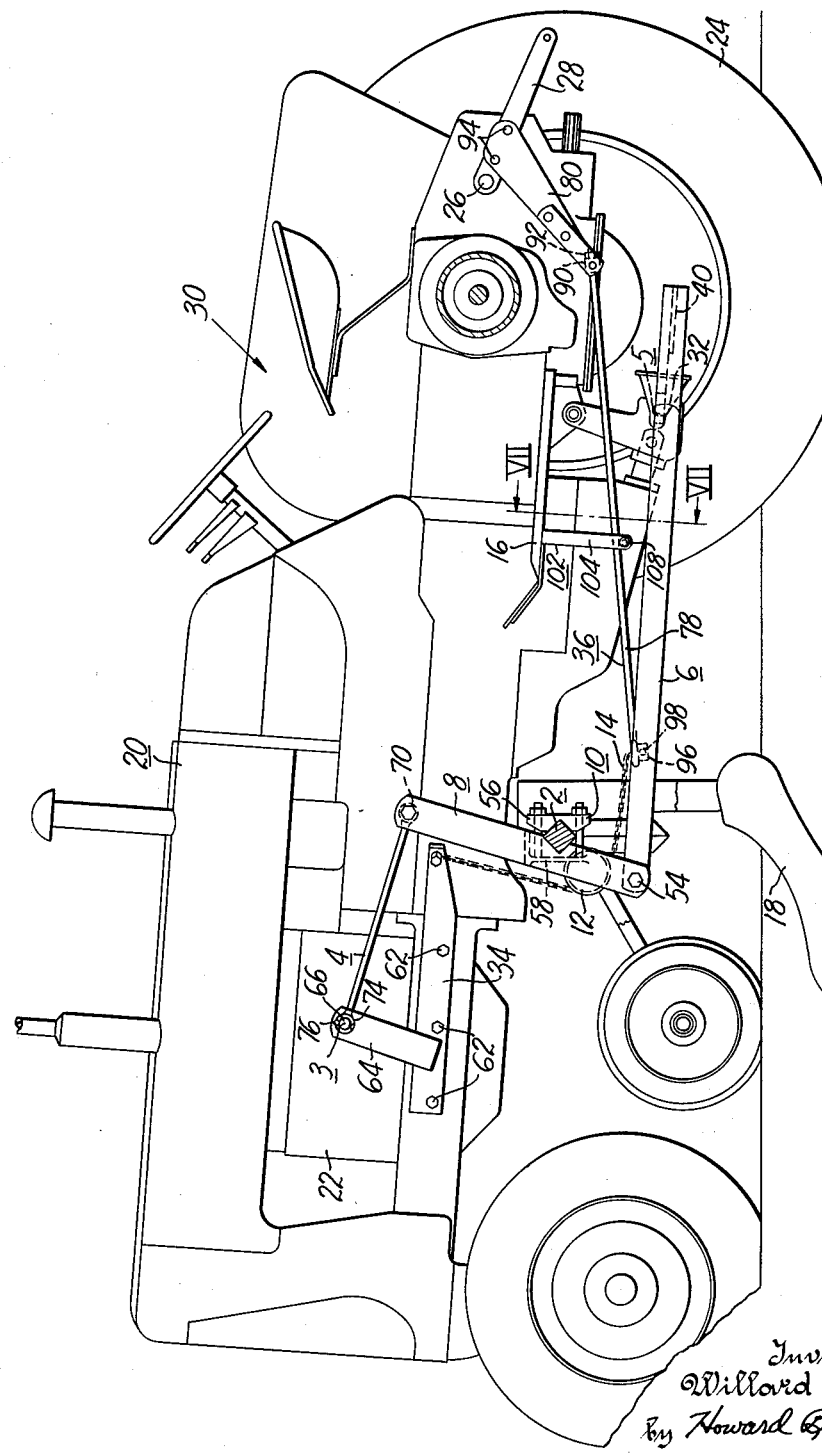
FIG. 1 is a side view of a tractor with the tools shown in ground engaging position.

Referring to FIG. 1 a tool bar 2 is supported by a Z-shaped linkage 4, 6 and 8. The free ends of the Z being pivotally connected at points 3 and 5 to the tractor. Link 4 is the upper horizontal part of the Z. Draw bar 6 is the lower horizontal part of the Z. And, main brace 8 is the diagonal part of the Z.

Tool bar 2 is clamped to main brace 8 by clamp 10.

Pulley 12 is connected to the Z-shaped linkage. The linkage is raised and lowered by chain 14 connected to lift arms 28.

Referring to FIG. 3, the pulley, chain, and draft bar 6 are located beneath the tractor platform 16 so the tractor can be mounted from the side.

When the linkage is raised, draw bar 6 cooperates with link 4 to constrain the movement of main brace 8 to substantially parallel movement.

Tool bar 2 carries ground engaging tools 18. Referring to FIG. 1, the draft load on tools 18 will try to rotate the tools counterclockwise around tool bar 2. Due to the Z-shaped linkage, link 4 and draft bar 6 will be placed in compression. The result is that the link and draft bar will share the draft load.

Finally (referring to FIG. 2), links 4 are positioned to extend rearwardly and outwardly. This angular spacing of the links in combination with draw bar 6, provides a system that supports tool bar 2 against sidewise or lateral movement, and braces the ends of tool bar 2.

Invention specifically

Referring to FIG. 1 there is disclosed a tractor or supporting vehicle 20. The tractor is of the usual type and includes a power plant 22 at its front, rear tractor wheels 24, rearwardly located implement lift shaft 26 carrying lift arms 28; and an operator's station indicated generally by arrow 30, that includes platform 16 for the operator.

The bottom of the tractor is also provided with a spring urged hook 32 for connection to draw bar 6. This type hitch connection is well known in the art. See for example the U.S. Patent to Tanke No. 2,814,976.

The tool bar support structures on each side of the tractor are right and left hand duplicates. Therefore the tool bar support structure of only one side will be described.

Referring to FIG. 1 the tool bar support structure comprises five main parts.

(1) Draw bar 6;
(2) Main brace 8 that carries tool bar 2;
(3) Link 4;
(4) Base plate 34; and
(5) Lift means 36 to raise members 4, 6 and 8.

Draw bar

Referring to FIG. 5, draw bar 6 is V-shaped. It has a brace 38 near its front. A second brace 40 is carried at its apex or rear.

Connected to second brace 40, by bolts 44, is a hitch member 46. The hitch member has an eye 48 that is engaged by spring urged hook 32 on the tractor.

When the draw bar is connected to the tractor, the draw bar extends forwardly and outwardly from its pivot point 5 that is beneath the rear of the tractor. Pivot point 5 permits vertical swinging movement of the front end of the draw bar.

Main brace

Main brace 8 carries tool bar 2. The main brace is made up of two spaced members 50 and 52 (FIGS. 4 and 6).

Referring to FIG. 4, the upper ends of the spaced members 50, 52 receive link 4 between them. The lower end of member 52 is bent and positioned along side member 50. The brace is pivotally connected at its lower end to draw bar 6 by bolt 54 that extends through opening 55 (FIG. 5) in the leg of the draw bar.

Main brace 8 (FIG. 4) carries clamp means 10 between members 50, 52 for holding tool bar 2. The clamp means comprise cap 56 and bolting arrangement 58 for clamping the tool bar to the main brace.

Tool bar 2 (FIG. 2), is a unitary bar that extends from one side of the tractor to the other side. It is provided with a curved portion 60 (FIG. 4) to clear the under belly of the tractor. Ground engaging tools 18, illustrated as bedder bottoms are carried by the tool bar.

Base plate

Base plate 34 serves as an anchor for link 4. The plate is fixed by bolts 62 (FIG. 1) to the side of the tractor near the front of the tractor. The base plate is positioned vertically above and forwardly of draw bar 6.

Fixed to the base plate is a vertically and upwardly extending arm 64. Arm 64 carries a shaft 66 that serves as the pivot point for link 4.

Link

Link 4 (FIG. 4) pivotally interconnects main brace 8 with base plate 34. The link is provided with a front socket 68 and a rear socket 70. Rear socket 70 is received between members 50, 52 of the main brace. And, front socket 68 is connected to arm 64.

Means in the form of bolt 72 pivotally interconnects socket 70 and members 50, 56. Referring to FIG. 2, means in the form of shaft 66, cap 74 and cotter pin 76 pivotally interconnect socket 68 and arm 64.

Lift means

Referring to FIG. 3, lift means 36 that raises the members 4, 6 and 8 comprises: a flexible member in the form of chain 14; means in the form of a lift rod 78 connected to the rear of chain 14; extension arm 80 to connect the lift rod to lift arm 28 of the tractor; pulley 12; means (FIG. 6) in the form of straps 82, 84 supporting the pulley for connection to the front of draw bar 6 and brace 8; and, means, to connect the front of the chain to the rearward and outwardly bent end 88 of the base plate 34, comprising bolt 89.

Chain 14 is positioned to engage underneath pulley 12. The chain raises the draw bar when lift arm 28 is raised, or rotated counterclockwise.

The rearward end of lift rod 78 passes through a trunnioned member 90 carried by the extension arm 80. The rear end of the rod is threaded to receive nut 92. The extension arm is rigidly secured to lift arm 28 by means of bolts 94.

The forward end of the lift rod is adjustably connected to chain 14 by a set collar 96 (FIG. 3). The set collar is a sleeve with a set screw 98 threaded through it. The chain passes through the sleeve and the set screw is threaded into a chain link.

Referring to FIG. 6, pulley 12 is connected by bolt 100 to main brace member 50. The pulley and main brace are held together as a unit and are both pivotally connected to draft bar 6 by bolt 54.

Guide 102 (FIGS. 3 and 7) is provided to limit the downward movement of lift rod 78 when chain 14 is slack. It also limits lateral movement of the lift rod. The guide comprises two spaced elements 104, 104 fastened by bolts 106 to the bottom of tractor platform 16. The elements are connected by bolt 108 at their lower end. The lift rod is received between the elements and bolt 108 acts as a limit stop to limit downward movement of the lift rod.

Operation

Assume the tools are in ground engaging position and are being raised.

When tractor lift arms 28 are raised, lift rods 78 are moved rearwardly. This tensions chain 14 and raises pulley 12. Draw bar 6 pivots upwardly about its pivot point 5. Tool bar 2 and its ground engaging tools 18 are raised. Main brace 8 is moved upwardly by the draw bar. The lower portion of the main brace swings in an arc with draw bar 2. The upper end of the main brace swings in an arc with link 8 around pivot point 3. The link and draw bar cooperate to constrain the main brace to substantially parallel movement during the working range of the tools.

To lower the tools, lift arms 28 are rotated clockwise. The tools will move downwardly under their own weight.

To adjust the height of tools 18 roughly, set collar 96 on the end of chain 14 can be used. Fine adjustment can be made by adjusting nut 92 located on the rearward threaded end of lift rod 78.

Summary

Some of the advantages in this type of lift structure are:

(1) Ground engaging tools 18 move substantially parallel.

(2) Elimination of structure that blocks access to the operator's station 30.

(3) Tool bar 2 is supported by links 4 and draft bar 6 and is less subject to side sway.

It is also noted that the links are provided with large bearing sleeves. The use of large sleeves provides greater support of the main brace and tool bar.

(4) The draft load on tools 18 is distributed between draft bar 6 and links 4.

Although a single embodiment of the present invention has been illustrated and described, it will be apparent to those skilled in the art that various changes and modifications may be made therein without departing from the invention or from the scope of the appended claims.

What is claimed is:

1. In a tool bar support structure for a tractor having a movable lift arm, the combination comprising: a vertically swingable draw bar pivotally connected at one end to said tractor and extending toward the front of said tractor; a main brace pivotally connected to the other end of said draw bar; a base plate fixed to the side of said tractor forwardly of said draw bar, said plate being positioned vertically above said draw bar; a link; means pivotally interconnecting said link with said base plate that is forwardly of said draw bar; means pivotally interconnecting said link with said main brace, said link and draw bar being positioned to cooperate and constrain said main brace to parallel movement; and, means interconnecting said lift arm of said tractor to said draw bar to raise said draw bar in response to raising of said lift arm.

2. A device as set forth in claim 1, wherein said tractor lift arm is located at the rear of said tractor, and wherein said tractor has an operator's station, and said draw bar is pivotally connected to said tractor vertically below said operator's station; and, said means interconnecting said lift arm at the rear of said tractor to said draw bar is connected to said lift arm to pass vertically below said operator's station on the tractor.

3. In a tool bar support structure for a tractor having a lift arm, the combination comprising: a vertically swingable draw bar pivotally connected at one end to said tractor and extending toward the front of said tractor; a pulley; means connecting said pulley to the other end of said draw bar; a base plate fixed to the side of said tractor, said base plate being positioned vertically above said pulley; a flexible member; means connecting one end of said flexible member to said base plate; and, means connecting the other end of said flexible member to said tractor's lift arm; said flexible member positioned to engage said pulley and raise said draw bar in response to raising of said lift arm.

4. In a tool bar support structure for a tractor having a lift arm, the combination comprising: a vertical swingable draw bar pivotally connected at one end to said tractor and extending toward the front of said tractor; a main brace pivotally connected to the other end of said draw bar; a base plate fixed to the side of said tractor, said base plate being positioned vertically above and forwardly of said draw bar; a link; means pivotally interconnecting said link with said base plate; means pivotally interconnecting said link with said main brace, said link and draw bar being positioned to cooperate and constrain said main brace to parallel movement; a pulley; means connecting said pulley to the same end of said draw bar to which said main brace is connected; a flexible member; means connecting one end of said flexible member to said base plate; and, means connecting the other end of said flexible member to said tractor lift arm; said flexible member positioned to engage said pulley and raise said draw bar in response to raising of said lift arm.

5. In a tool bar support for a tractor having lift arms, the combination comprising: a V-shaped draw bar; means carried at the apex of said V-shaped draw bar to pivotally connect said draw bar to said tractor at the rear of said tractor; the legs of said V extending forwardly towards the front of said tractor and diverging from said point of connection; an individual base plate fixed to each side of said tractor at the front of said tractor, each of said base plates positioned vertically above and forwardly of said draw bar; each of said base plates including an arm extending vertically upwardly therefrom; an individual main brace pivotally connected to the front of an individual leg of said V-shaped draw bar; means carried by said main braces to clamp a tool bar to said main braces; an individual link pivoted to an individual arm, each of said individual links pivotally connected to an individual main brace; an individual pulley rotatably connected to each leg of said V-shaped draw bar; an individual flexible member; individual means connecting an end of each flexible member to an individual lift arm of said tractor; individual means connecting the other end of each of said flexible members to an individual base plate; each of said flexible members positioned to engage the under surface of said pulleys to raise said tool bar in response to raising of said lift arm.

6. A device as set forth in claim 5 wherein said links extend outwardly and rearwardly from their point of attachment to said arms carried by base plates to their points of attachment to said main braces, to support said tool bar.

7. In a tool bar support structure for a tractor having a lift arm, the combination, comprising: a Z-shaped linkage having the horizontally extending legs pivotally connected to the diagonal member and having the free ends of the Z pivotally connected to the tractor; lift means tor to raise said linkage about its free ends in response interconnecting said linkage and said lift arm of said tractor to raising of said lift arm, said horizontally extending legs of said Z-shaped linkage being positioned to cooperate and constrain said diagonal member of said Z-shaped linkage to parallel movement.

References Cited in the file of this patent

UNITED STATES PATENTS

| | | |
|---|---|---|
| 2,250,073 | Weimer | July 22, 1941 |
| 2,341,804 | Mott et al. | Feb. 15, 1944 |
| 2,574,113 | Landry | Nov. 6, 1951 |
| 2,611,306 | Strehlow et al. | Sept. 23, 1952 |
| 2,675,751 | Weber | Apr. 20, 1954 |
| 2,696,773 | Reaves et al. | Dec. 14, 1954 |